United States Patent
Shan et al.

(10) Patent No.: US 10,291,763 B2
(45) Date of Patent: May 14, 2019

(54) MULTI-MODAL MOBILE-DEVICE PROJECTION MECHANISM FOR EFFICIENT RESOURCE SHARING

(71) Applicant: GM Global Technology Operations LLC, Detroit, MI (US)

(72) Inventors: Dan Shan, Troy, MI (US); Fan Bai, Ann Arbor, MI (US); Robert A. Hrabak, West Bloomfield, MI (US); Nikhil N. Neti, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 15/468,927

(22) Filed: Mar. 24, 2017

(65) Prior Publication Data

US 2018/0278738 A1 Sep. 27, 2018

(51) Int. Cl.
*H04M 1/02* (2006.01)
*H04M 1/725* (2006.01)

(52) U.S. Cl.
CPC ....... *H04M 1/7253* (2013.01); *H04M 1/0272* (2013.01); *H04M 2250/54* (2013.01)

(58) Field of Classification Search
CPC ............ B60K 35/00; B60K 2350/2052; B60K 2350/1052; B60K 2350/901; B60K 2350/1028; B60K 2350/1044; B60K 2350/106; B60K 2350/1068; G06F 3/017; G06F 3/011; G06F 3/0481; G06F 3/04883; G06F 17/211; G06F 17/5009; G06F 1/1694; H04L 67/32; H04L 67/12; H04L 1/008; H04L 29/06578; H04L 43/0811; H04L 43/0858; H04L 43/0876; H04W 4/046; H04W 4/80; H04W 12/02; H04W 12/04; H04W 12/06; H04W 12/08; H04W 28/0215; H04W 28/06; H04W 36/08

See application file for complete search history.

(56) References Cited

U.S. PATENT DOCUMENTS

| 2016/0378861 A1* | 12/2016 | Eledath | G06K 9/00718 707/766 |
|---|---|---|---|
| 2017/0274771 A1* | 9/2017 | Sisbot | H04W 76/10 |
| 2018/0109625 A1* | 4/2018 | Jayaraman | H04L 67/141 |

* cited by examiner

*Primary Examiner* — Golam Sorowar
(74) *Attorney, Agent, or Firm* — Parks IP Law LLC

(57) ABSTRACT

A multi-modal projection system, such as a smartphone, a wearable, or a generic universal-serial-bus-class (generic USB-class), for use in projecting device output via a host apparatus, such as a transportation vehicle. The system includes a hardware-based processing unit (processor), and a base data-processing resource needed by each of a plurality of interface components to generate the output to be projected via the host apparatus. The system includes a non-transitory computer-readable storage component having the interface components that, when executed by the processing unit, generate the output to be projected via the host apparatus. The storage component further includes a plurality of virtual data-processing components being virtual representations of the base data-processing resource. The storage component further includes a mapping module that, when executed, controls access for the interface components to the base data-processing component by way of the virtual data-processing components. Non-transitory computer-readable storage devices, methods performed by the structure described.

20 Claims, 8 Drawing Sheets

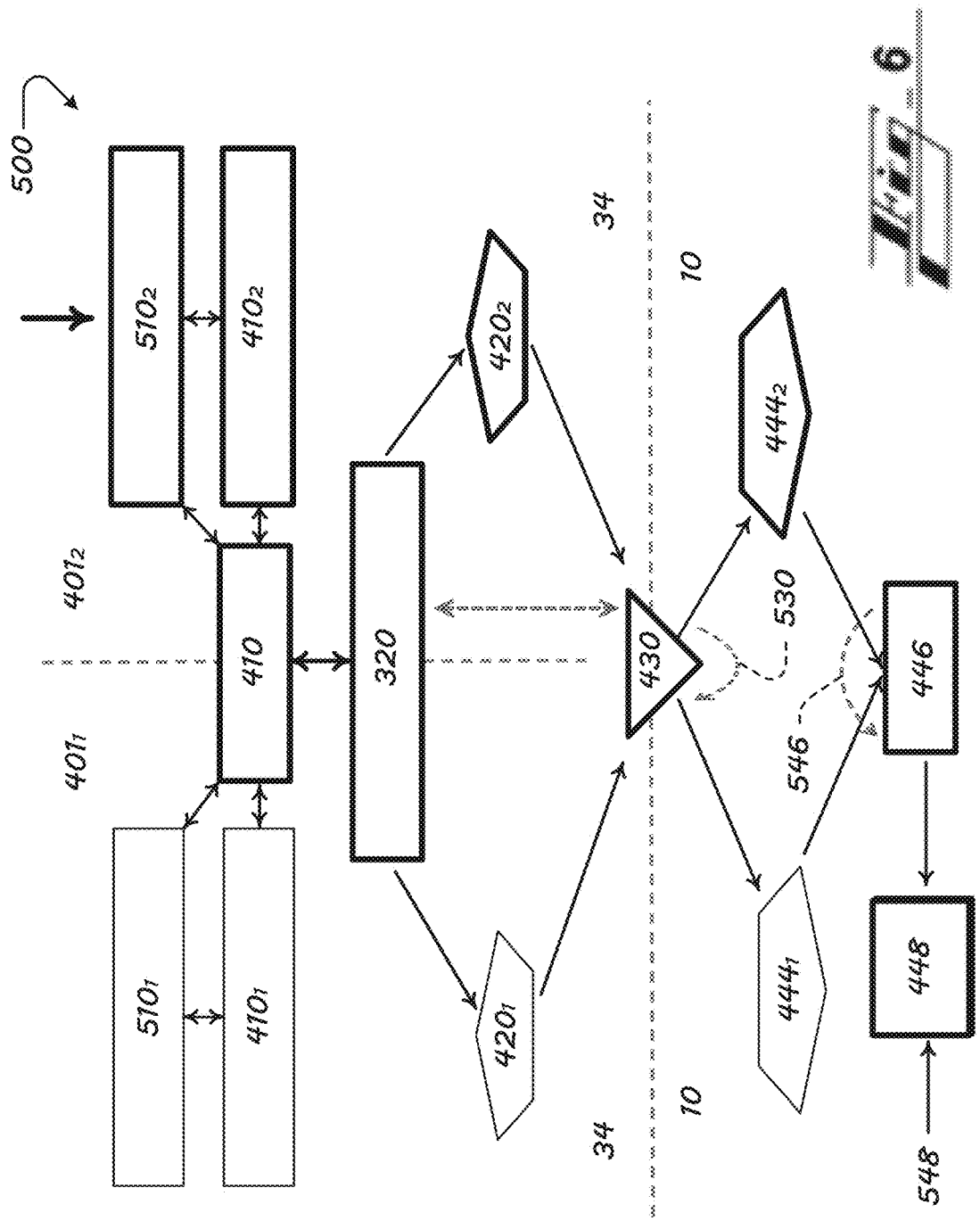

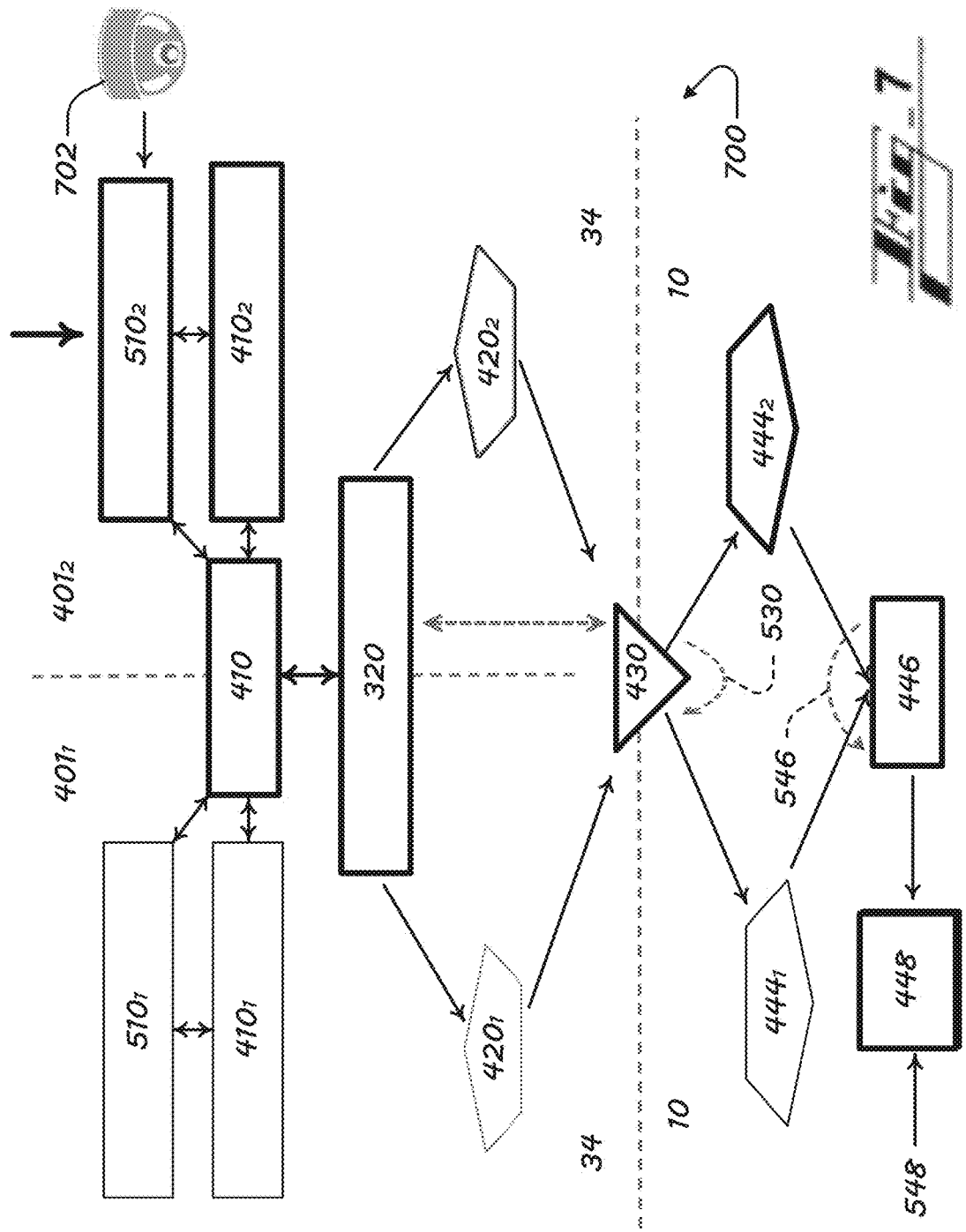

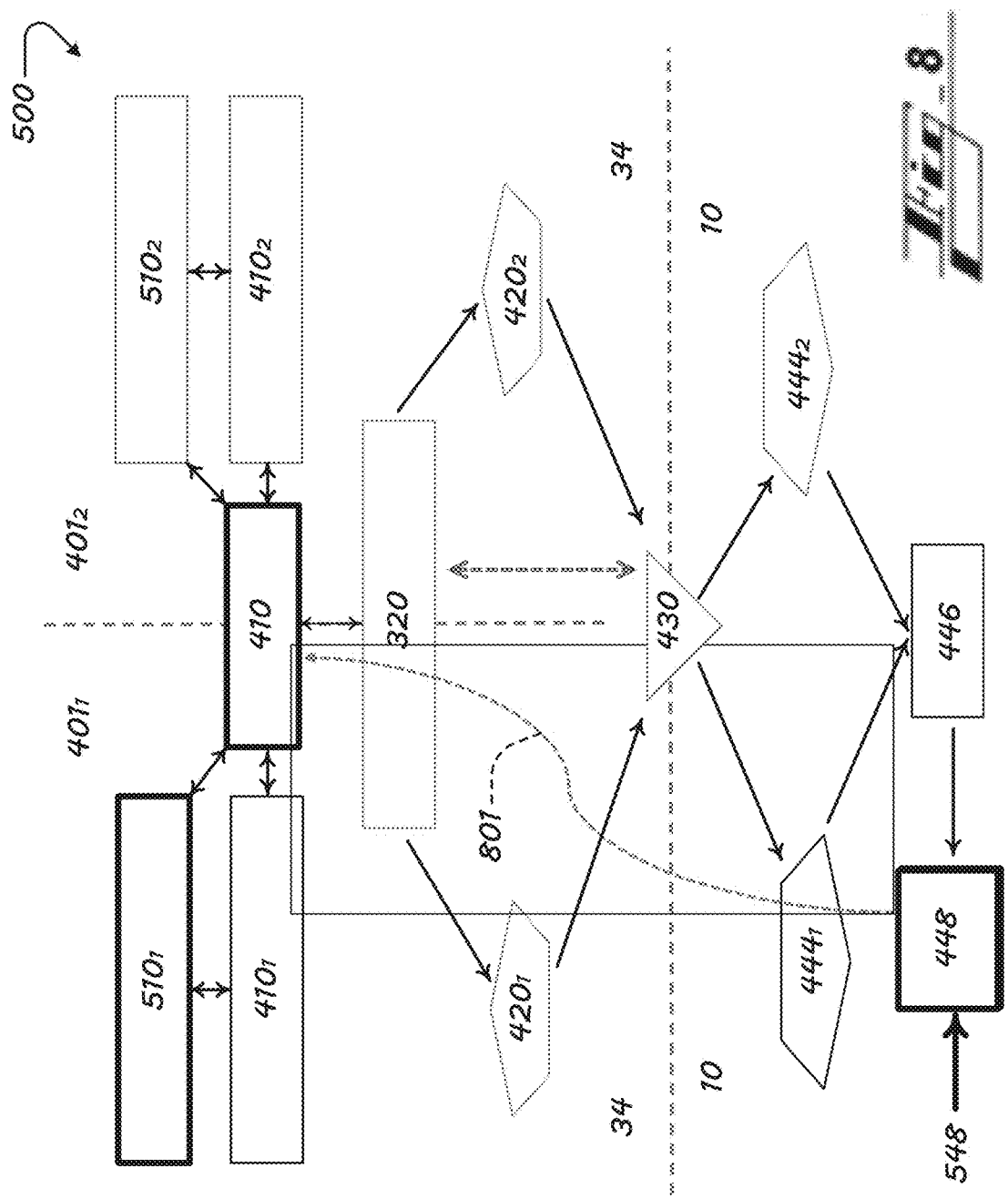

MULTI-MODAL MOBILE-DEVICE PROJECTION MECHANISM FOR EFFICIENT RESOURCE SHARING

TECHNICAL FIELD

The present disclosure relates generally to mobile-device projection systems and, more particularly, to a multi-modal projection arrangement for efficient resource sharing in connection with projecting to a vehicle infotainment system.

BACKGROUND

This section provides background information related to the present disclosure which is not necessarily prior art.

Phone projection systems are becoming increasingly popular. Most systems are implemented with smartphones and vehicles for human transportation.

A projection system allows a user to operate a smartphone via a vehicle interface, such as a touch-sensitive display or audio system. Also, select output of compatible mobile-device applications, such as mapping or video apps, are received from the phone and communicated the user by way of the vehicle interface.

Typically only one projection system, and usually only one smartphone app, interfaces with the vehicle at a time. The projection system and app use limited smartphone resources, such as hardware codecs and hardware encryption components.

SUMMARY

Apparatus, algorithms, and processes are desired allowing more than one local-computing-device projection system and/or more than one local-computing-device application to operate and interface with a host apparatus, such as a vehicle of transportation, generally simultaneously and efficiently.

The local computing device in various embodiments takes any of a wide variety of formats, such as a smartphone, a user wearable device, or a generic universal-serial-bus (USB) class system, and can be referred to generically by any of a variety of terms, such as user-electronic device, mobile device, and local computing device.

Traditional challenges to multiple projections systems and/or multiple apps operating on a local computing device simultaneously to project to a host apparatus, such as a vehicle head unit, include each projection system and app each needing to somehow use limited local-computing-device resources at the same time.

Apparatus, algorithms, and processes of the present technology are configured to allow hardware-software device function virtualization, or HW/SW DFV, at the local-computing-device. The solution in various embodiments includes isolating some or all control plane operations from some or all data plane operations of the local computing device.

In one aspect, the present technology relates to a mobile-communication or mobile-computing device or system, for use in projecting output via a host apparatus. The mobile-communication device includes a hardware-based processing unit, and a base data-processing resource needed by each of a plurality of interface components to generate the output to be projected via the host apparatus.

The mobile-communication device also includes a non-transitory computer-readable storage component. The computer-readable storage component comprises the interface components that, when executed by the processing unit, generate the output to be projected via the host apparatus.

The storage component further includes a plurality of virtual data-processing components being virtual representations of the base data-processing resource.

The storage component further includes a mapping module that, when executed by the processing unit, controls access to the base data-processing component by way of the virtual data-processing components.

In various embodiments, the interface components include two or more mobile-device projection systems; or a mobile-device projection system and a mobile-device application.

In various embodiments, the mapping module, in controlling access to the base data-processing component by way of the virtual data-processing components, performs switching or multiplexing functions.

In various implementations, the mapping module, in controlling access to the base data-processing component by way of the virtual data-processing components, controls the access based on at least one algorithm comprising an optimization equation, a cost-function equation, a penalty-function equation, or a restraint-function equation. These optional equation types can be referred to generally as optimization equations.

In various embodiments, the base data-processing component includes a hardware-based component, or a software part directly mapped to hardware, selected from a group consisting of: a framebuffer component; a codec component; an encryption component; and a data-piping component. Further, the virtual data-processing component are in some implementations virtual representations of the selected base data-processing resource.

In various embodiments, the base data-processing component is a first base data-processing component; the mapping module may include multiple sub-modules, the first sub-module controlling access to the first base data-processing component; the plurality of virtual data-processing components being virtual representations of the base data-processing resource are a first plurality of virtual data-processing components being virtual representations of the first base data-processing resource; the system further comprises a second base data-processing resource needed by each of the interface components to generate the output to be projected via the host apparatus; the non-transitory computer-readable storage component comprises a plurality of virtual data-processing components being virtual representations of the base data-processing resource; and the mapping module (or a second sub-module of the mapping module), when executed by the processing unit, controls access to the second base data-processing component by way of the second virtual data-processing components.

In various embodiments, the mobile-communication device is part of a smartphone, user-wearable electronic, or a generic USB class system. And the device may further include a mobile-device data-piping hardware component that receives output from upstream data-processing components of the mobile-communication device and delivers the output to a corresponding host-apparatus data-piping hardware component for delivery via the host apparatus for consumption by a user of the mobile-communication device and the host apparatus. Examples of data-piping hardware include and are not limited to WiFi, USB, Bluetooth, WiGig, LTE, etc.

In some implementations, the host apparatus is part of a vehicle of human transportation.

In various embodiments, the host apparatus includes a human-machine interface for delivering the output for consumption by a human user of the mobile-communication device and the host apparatus.

In various embodiments, the non-transitory computer-readable storage device comprises an interface-component generation module that, when executed by the hardware-based processing unit, generates the plurality of interface components.

Various aspects of the present technology include a non-transitory computer-readable storage devices configured to perform any of the operations described, algorithms to perform any of the operations described, and the processes including the operations performed by these systems, storage devices, and algorithms.

Other aspects of the present technology will be in part apparent and in part pointed out hereinafter.

DESCRIPTION OF THE DRAWINGS

FIG. 6 shows the arrangement of FIG. 5, with operations of a second projection system of the local computing device highlighted.

FIG. 7 shows the arrangement of FIG. 5 along with an input apparatus, such as a wireless camera apparatus, interacting with a projection system and an application at the local computing device.

FIG. 8 shows the arrangement of FIG. 5 showing user input provided via a host-vehicle interface to the first projection system.

Figure 1:
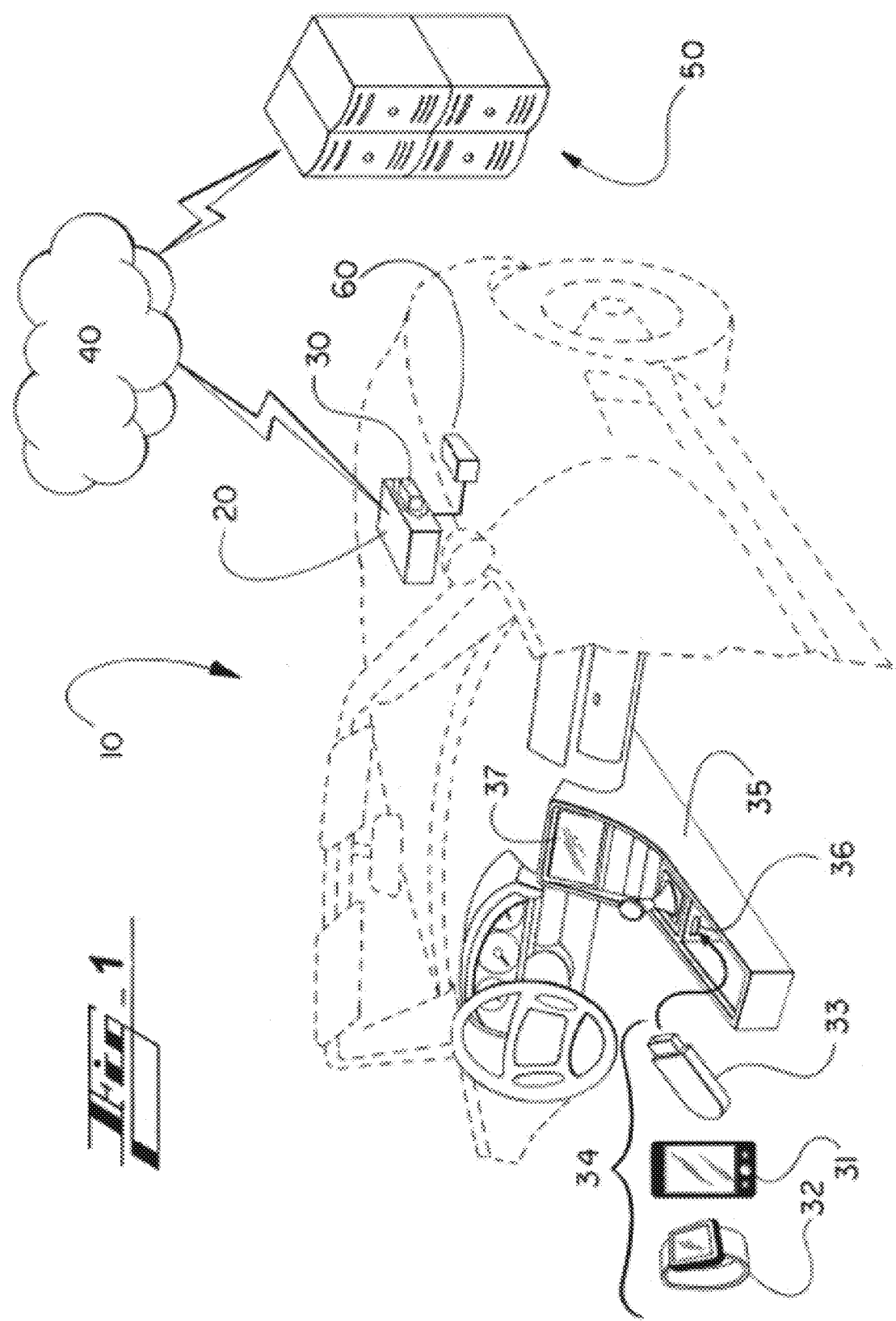
FIG. 1 illustrates schematically an example vehicle with local and remote computing devices according to embodiments of the present technology.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, apparatus, algorithms, and processes configured to allow efficient and, at times, generally simultaneous, use of multiple local-computing-device projection systems and/or user-device apps via such projection system(s). The novel functioning is enabled by structure and algorithms allowing local-computing-device projection systems and apps to intelligently and dynamically share local-computing-device data-processing resources.

The structure and algorithms allow virtualization of data-processing resources, such as hardware framebuffering, code, encryption, and data-piping components. The virtualization can be referred to as hardware-software device function virtualization, or HW/SW DFV.

In various embodiments, operations of local-computing-device control plane and data plane operations are isolated to promote efficient sharing of local-computing-device resources.

While select examples of the present technology describe uses in smartphones as the user, mobile or local-computing device, the technology is not limited by the focus. Other example local computing-devices include user wearables, such as smartwatches, smart glasses, etc. Other example local computing devices include a generic universal-serial-bus (USB) class, a mass-storage-device-class devices or plug-in devices which can connect to the vehicle by plug-in port, wire, or wirelessly. An example mass-storage-device-class device is the USB mass storage device class, also known as USB MSC or UMS.

While select examples of the present technology describe uses in connection with transportation vehicles or modes of travel, and particularly automobiles, the technology is not limited by the focus. The concepts can be extended to use with a wide variety of apparatus, such as other transportation or moving vehicles including aircraft, watercraft, trucks, busses, trolleys, trains, manufacturing equipment (for example, forklifts), construction machines, and agricultural machinery, or of warehouse equipment, devices at the office, home appliances, the like, and other.

II. Example Arrangement of Mobile Devices and Vehicle—FIG. 1

Turning now to the figures and more particularly to the first figure, FIG. 1 shows an example host structure or apparatus 10 in the form of a vehicle.

The host apparatus 10 includes a hardware-based controller or controller system 20. The hardware-based controller system 20 includes a communication sub-system 30 for communicating with mobile or local computing devices 34 and external networks 40.

By the external networks 40 (such as the Internet, a local-area, cellular, or satellite network, vehicle-to-vehicle, pedestrian-to-vehicle, road-side infrastructure networks, the like, or other), the host apparatus 10 can reach mobile or local systems 34 or remote systems 50, such as remote servers.

Example local computing devices 34 include a user smartphone 31, a wearable device 32 in the form of smart eye glasses, and a generic USB class or mass-storage-protocol plug-in device 33, a camera (of any suitable type—e.g., camera xx), and are not limited to these examples. Other example wearables 32 include smart apparel, such as a shirt or belt, an accessory such as arm strap, or smart jewelry, such as earrings, necklaces, and lanyards.

Still another example mobile or local device 34 is an on-board device (OBD) (not shown in detail), such as a wheel sensor, a brake sensor, an accelerometer, a rotor-wear sensor, a throttle-position sensor, a steering-angle sensor, a revolutions-per-minute (RPM) indicator, a brake-torque sensors, other vehicle state or dynamics-related sensor for the vehicle, with which the vehicle is retrofitted with after manufacture. The OBD(s) can include or be a part of the sensor sub-system referenced below by numeral 60.

The vehicle controller system 20, which in contemplated embodiments includes one or more microcontrollers, can communicate with OBDs via a controller area network (CAN) and/or Ethernet. The CAN/Ethernet message-based protocol is typically designed for multiplex electrical wiring with automobiles, and CAN/ETHERNET infrastructure may include a CAN/ETHERNET bus. The OBD can also be referred to as vehicle CAN/ETHERNET interface (VCI, VEI, etc.) components or products, and the signals transferred by the CAN/ETHERNET may be referred to as CAN/ETHERNET signals. Communications between the OBD(s) and the primary controller or microcontroller 20 are in other embodiments executed via similar or other message-based protocol.

The host apparatus 10 also has various mounting structures 35. The mounting structures 35 include a central console, a dashboard, and an instrument panel. The mounting structure 35 includes a plug-in port 36—a USB port, for instance—and a visual display 37, such as a touch-sensitive, input/output, human-machine interface (HMI).

Output at the host apparatus 10 is delivered to a user, which can be a human user or an electronic user, such as a computing function or component at the host apparatus 10 or a remote destination with which the host apparatus 10 is in communication, such as the server 50 mentioned. The user, whatever the type, can be considered a user of the local communication device and the host apparatus, because it receives output from subject interactions (DFV, projection, etc.) of the local computing device 34 and host apparatus 10.

The host apparatus 10 also has a sensor sub-system 60 including sensors providing information to the controller 20. Sensor input to the controller 20 is shown schematically at the right, under the vehicle hood, of FIG. 2. Example sensors having base numeral 60 ($60_1$, $60_2$, etc.) are also shown.

Sensor data relates to features such as vehicle operations, vehicle position, and vehicle pose, user characteristics, such as biometrics or physiological measures, and environmental-characteristics pertaining to a vehicle interior or outside of the host apparatus 10.

Example sensors include a camera $60_1$ positioned in a rear-view mirror of the host apparatus 10, a dome or ceiling camera $60_2$ positioned in a header of the host apparatus 10, a world-facing camera $60_3$ (facing away from host apparatus 10), and a world-facing range sensor $60_4$. Intra-vehicle-focused sensors $60_1$, $60_2$, such as cameras, and microphones, are configured to sense presence of people, activities or people, or other cabin activity or characteristics. The sensors can also be used for authentication purposes, in a registration or re-registration routine. This subset of sensors are described more below.

World-facing sensors $60_3$, $60_4$ sense characteristics about an environment 11 comprising, for instance, billboards, buildings, other vehicles, traffic signs, traffic lights, pedestrians, etc.

The OBDs mentioned can be considered as local devices, sensors of the sub-system 60, or both in various embodiments.

Local devices 34 (for instance, user phone, user wearable, or user plug-in device) can be considered as sensors 60 as well, such as in embodiments in which the host apparatus 10 uses data provided by the local device based on output of a local-device sensor(s). The vehicle system can use data from a user smartphone, for instance, indicating user-physiological data sensed by a biometric sensor of the phone.

The host apparatus 10 also includes cabin output components 70, such as audio speakers $70_1$, and an instruments panel or display $70_2$. The output components may also include a dash or center-stack display screen $70_3$, a rear-view-mirror screen $70_4$ (for displaying imaging from a vehicle aft/backup camera), and any vehicle visual display device 37.

III. Mobile User Device Computing System—FIG. 2

Figure 2:
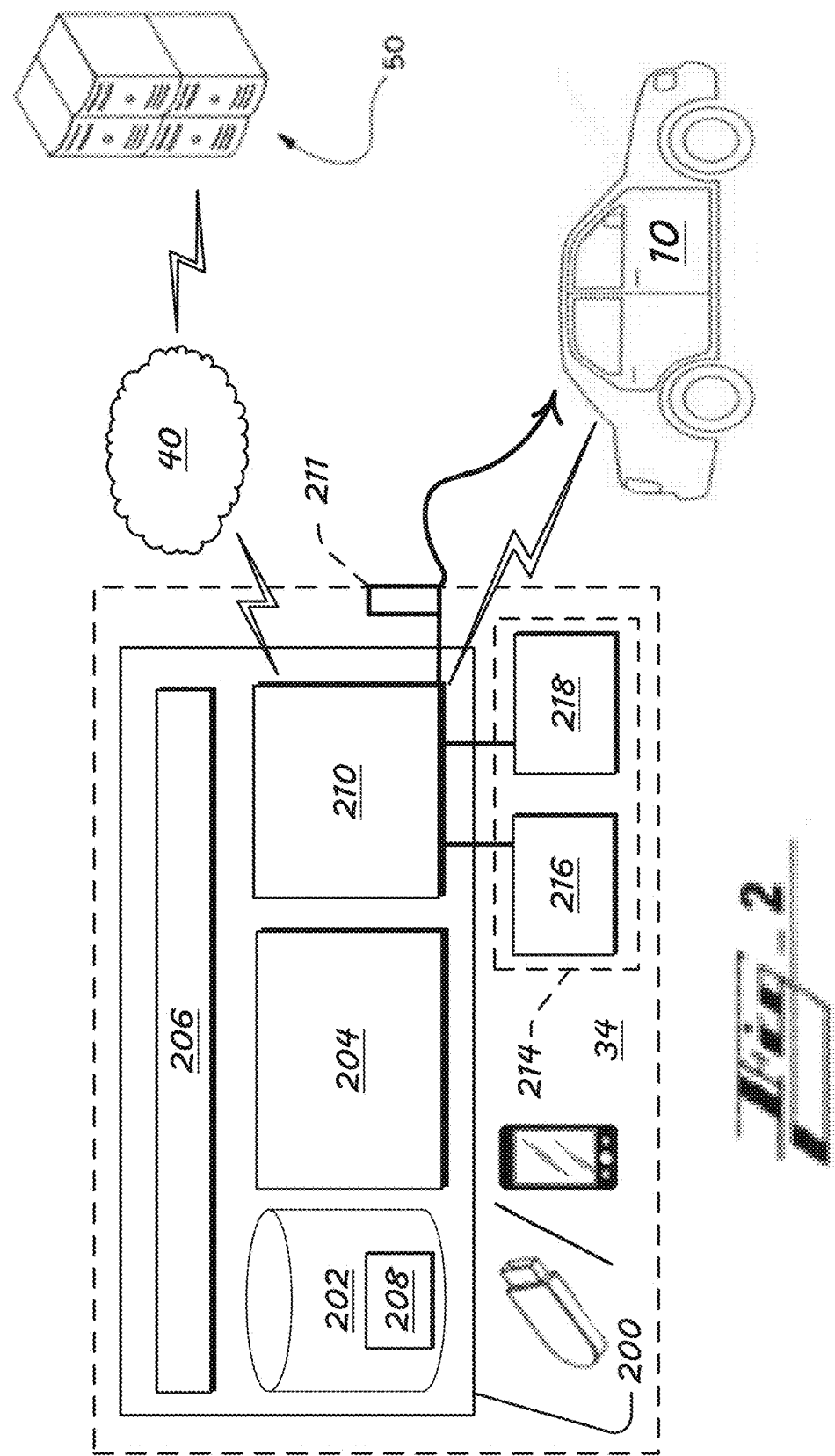
FIG. 2 illustrates schematically more details of the example local computing devices, such as a user smartphone or plug-in device, for use in connection with the vehicle of FIG. 1.

FIG. 2 shows an example hardware-based computer or computing system 200, for use at the local computing device 34, such as the smartphone 31, plug-in 33, or wearable device 32 (FIG. 1).

Although connections are not shown between all of the components illustrated in FIG. 2, the components can interact with each other to carry out system functions.

As shown, the computer system 200 includes a hardware-based memory, or computer-readable storage device 202, such as volatile medium, non-volatile medium, removable medium, and non-removable medium. The term computer-readable media and variants thereof, as used in the specification and claims, refer to tangible or non-transitory, computer-readable storage devices.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computer system 200 also includes a processing hardware unit 204 connected or connectable to the computer-readable storage device 202 by way of a communication link 206, such as a computer bus.

The processing hardware unit can include or be multiple processors, which could include distributed processors or parallel processors in a single machine or multiple machines. The processing hardware unit can be used in supporting a virtual processing environment. The processing hardware unit could include a state machine, application specific integrated circuit (ASIC), programmable gate array (PGA) including a Field PGA, or state machine. References herein to the processing hardware unit executing code or instructions to perform operations, acts, tasks, functions, steps, or the like, could include the processing hardware unit performing the operations directly and/or facilitating, directing, or cooperating with another device or component to perform the operations.

The computer-readable storage device 202 includes computer-executable instructions, or code 208. The computer-executable instructions 208 are executable by the processing hardware unit 204 to cause the processing hardware unit, and thus the computer system 200, to perform any combination of the functions described in the present disclosure.

The computer system 200 further comprises an input/output (I/O) device(s) 210, such as a wireless transceiver and/or a wired communication port. The processing hardware unit 204, executing the instructions 208, sends and receives information, such as in the form of messages or packetized data, to and from one or more communication networks 40, such as the Internet, and the devices 50 they are connected to—remote servers, road-side infrastructure, other vehicles, mobile devices, etc.

The input/output (I/O) device(s) 210 are configured for communicating with local and external devices and networks. The input/output (I/O) device 210 in various embodiments includes any of a wire-based input/output (i/o) port 211, at least one long-range wireless transceiver, and one or more short- and/or medium-range wireless transceivers.

The long-range transceiver is in some embodiments configured to facilitate communications between the input/output (I/O) device 210 and a satellite and/or a cellular telecommunications network, which can be considered also indicated schematically by reference numeral 40.

The short- or medium-range transceiver is configured to facilitate short- or medium-range communications, such as communications with vehicles, in device-to-vehicle (D2V) communications, and communications with transportation system infrastructure (D2I). Broadly, device-to-any device (D2X) can refer to short-range communications with any type of external entity—to, for example, another device associated with pedestrians or cyclists, etc.).

To communicate D2V, D2I, or D2X, the short- or medium-range communication transceiver may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 200 can, by operation of the processor 204, send and receive information, such as in the form of messages or packetized data, to and from the communication network(s) 40.

In some embodiments, the system 200 includes or is connected to one or more local input/output devices 214, including at least one local input device 216 and/or at least one local output device 218. The inputs 216 can include sensors such as positioning system components (e.g., GPS receiver), accelerometers, and camera systems. The outputs 218 can include visual and audio output, for instance.

The computing system 200, which in contemplated embodiments includes one or more microcontrollers, can communicate with host apparatus 10 (e.g., vehicle) OBDs via the mentioned host-apparatus 10 CAN and/or Ethernet networks of the, which are described further above.

IV. Host Computing System

The host-system hardware-based controller or computer includes all components needed and suitable for performing the functions described herein, though the host system is not shown in detail by the figures.

The host-system hardware-based controller includes, for instance, components analogous to those described above for the local computing system, such as a processing hardware unit executing code of a computer-readable storage, a communication link, such as a computer bus, and input/output componentry, such as the referenced communication sub-system 30.

FIG. 2 is thus considered to, by analogy, also illustrate schematically host-system (e.g., vehicle) computing components—processor, storage, etc.—analogous to the computing components of the local computing device 34 shown and described.

V. Algorithms and Processes—FIGS. 3-8

V.A. Introduction to the Algorithms and Processes

FIGS. 3-8 show schematically example hardware and software components of local-computing devices 34, and host apparatus 10.

The views also show select functions thereof, including interactions between local-computing-device components and host-system components.

Any of the components, functions, or processes can be divided or combined into, or performed by one or more components, functions, or processes, without departing from the scope of the present technology.

It should be understood that steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

In certain embodiments, some or all operations of the processes and/or substantially equivalent operations are performed by a computer processor, such as the hardware-based processing unit 204 of the local computing device 34 or analogous computing components of the host apparatus 10, executing computer-executable instructions stored on a non-transitory computer-readable storage device of the respective device or system, such as the data storage device 202 of the local computing device and analogous storage of the host apparatus 10.

Figure 3:
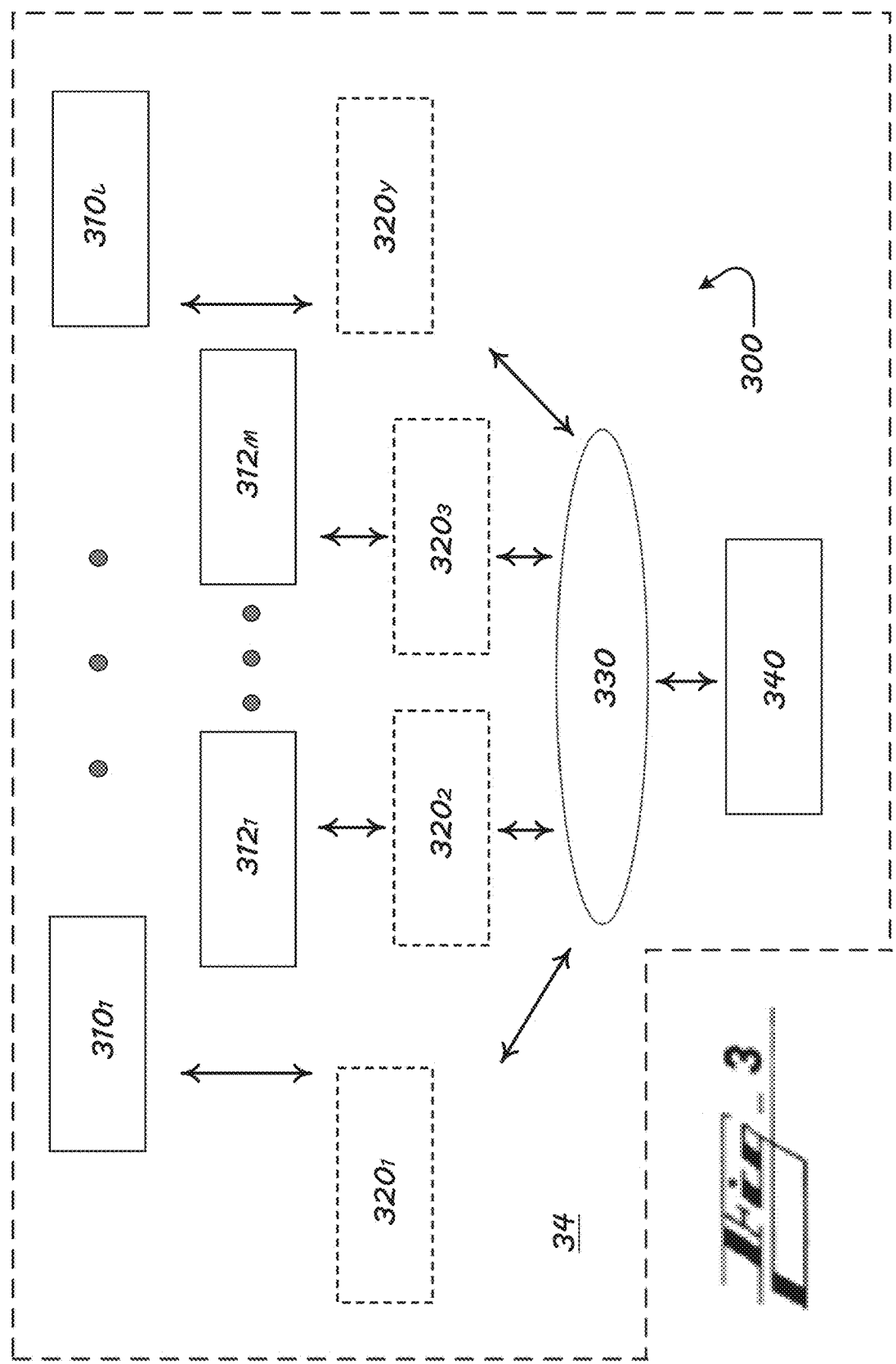
FIG. 3 shows example dynamic mapping functions schematically, for facilitating efficient resource sharing at a local computing device.

V.B. FIG. 3—First Example Components and Functions

FIG. 3 shows schematically an example arrangement 300 configured to perform dynamic, intelligent mapping functions, for facilitating efficient resource sharing at the local computing device 34.

The arrangement 300 shows multiple interface components, including projection systems $310_1$-$310_L$ operating on the local computing device 34, where L is a non-zero, non-negative integer, and including one or more applications $312_1$-$312_M$ being used in connection with one or more of the projection systems 310, where M is a non-zero, non-negative integer.

The interface components can also be referred to as server components, or simply servers.

A total number of interface components 310, 312 is represented by symbol N (not shown in FIG. 3), such as in connection with the one or more intelligent, dynamic mapping algorithms of the present technology described further below.

The interface components 310, 312 are referred to as interface components because they are configured, arranged, and operate to interface between two or more items described herein, such as a component, a device, a system, an entity (e.g., user), the like or other. The interface components 310, 320 can be referred to by other terms, such as servers.

The arrangement 300 also includes multiple virtual data-layer, or data-processing, components $320_1$-$320_Y$, such as an encoder or codec component, where Y is a non-zero, non-negative integer.

Each virtual component 320 is a data-layer version of a base or primary data-processing component or resource 340 of the local computing device 34.

In various implementations, each interface component 310, 312 has a dedicated virtual data-processing component 320, or Y=L+M.

Virtual data-processing components (DPCs) 320 are in various embodiments generated by a local computing device module (not shown in detail), which can be referred to as a DPC-generating module, executed by the local-device processor 204 (FIG. 2).

One or more of the base data-processing components 340 in various embodiments comprise fully or partially hardware, and each virtual version 320 is a software-based virtualization implement having access to a corresponding base data-processing component 340.

An example base data-processing component 340 is, as mentioned, a code or encoder. An example base codec is an H.264 encoder. In this case, two or more virtual H.264 encoders $320_{1-Y}$ are generated based on the base H.264 codec 340 to connect to two or more interfacing components 310, 312 with functions of the base H.264 codec 340.

The virtual data-layer components $320_{1-Y}$ can, like all features described herein, be referred to by other terms. The virtual data-layer data-processing components $320_1$-$320_Y$ can be referred to as virtual data-processing components, for instance, including in cases in which an entirety of the virtual components 320 may not be considered fully within a data layer of the local computing device. As another example, the virtual data-layer data-processing components $320_{1-Y}$ can be referred to as a virtualization, a virtual component, the like, or other.

As mentioned, each interfacing component 310, 312 using or to use the base data-processing component 340 may, in the arrangement 300, be assigned a unique virtual data-processing component (DPC) of the total DPCs $320_1$-$320_Y$, for its exclusive use.

In a further contemplated embodiment, assignments, associations, or links between an interfacing component 310, 312 and a virtual data-processing component 320 can be changed, such as by an assignment, association, or link being changed or removed, or a new link can be created to an existing or new virtual representation 320.

In a further contemplated embodiment, a single virtualization 320 is linked to more than one interfacing component 310, 312. And/or more than one virtualization 320 is linked to a single interfacing component 310, 312.

The virtual components $320_1$-$320_Y$ are virtual versions generated based on a base, or primary component 320 of the local computing device 34.

The virtualization is provided to allow use, by two or more projection systems $310_1$-$310_N$ and applications $312_1$-$312_M$ [such as: (a) one projection system and one app, (b) two projections systems, (c) more than two projections systems, or (d) more than two apps via at least one projection system], of the base data-processing component 340.

In other words, the base component 320 is virtualized so that it can be used by more than one interface component 310, 312. Use by the interface components 310, 312 of the base component 340 can be performed generally simultaneously or at the same time by way of the virtualization.

The virtualization can be referred to as a hardware/software (HW/SW) Device Function Virtualization (DFV).

The local computing device 34 and the arrangement 300 further include a dynamic mapping component 330 joining the base component 320 and its virtual versions $320_1$-$320_L$.

Generally same-time usage of the base data-processing component 340 is enabled by the dynamic mapping component 330. The dynamic mapping component 330 is configured to control sharing or function distribution for the base data-processing component 340, via the virtual components 320, to meet needs of the interface components 310, 312.

Generally, the mapping component 330 is configured to dynamically map or control interactions between the base data-processing component 340 and the interface components 310, 312 needing the base data-processing component 340, via the virtual components 320. In a contemplated embodiment, the mapping component controls interactions between various levels of data-processing components, as described further below in connection with FIG. 4 et seq.

An example resource-sharing factor or characteristic, of the resource sharing, is timing of usage. The dynamic mapping controls, for instance, which interface component(s) 310, 312 can at respective moments use the base data-processing component 340, via a respective virtual component $320_Y$.

In various embodiments, the resource-sharing factor includes functions or data to be provided by the base data-processing component 340 via the virtualizations 320. The dynamic mapping controls, for instance, what functions or data the base data-processing component 340 provides to the interface components 310, 312 by way of the virtual representations $320_Y$.

In various embodiments, the resource-sharing factor(s) include more than one factor considered in the dynamic mapping together, such as time, type of function, type of data, the like, or other.

The dynamic mapping component 330 is in various embodiments programmed with at least one algorithm configured to determine in real time how the base resource component 340 is shared by the interface components 310, 312 using the virtual representations 320.

The algorithm(s) can, like all features described herein, be referred to by any of a variety of terms. As with all items referenced herein, references to a singularity (e.g., a single algorithm) can refer to multiple instances (e.g., multiple algorithms).

Terms for the algorithm include dynamic-mapping algorithm, intelligent-mapping algorithm, optimization algorithm, switching algorithm, multiplexing algorithm, switching-and-multiplexing algorithm, intelligent switching algorithm, intelligent multiplexing algorithm, the like, or other.

The optimization algorithm in various embodiments is configured to, by the intelligent switching and multiplexing, optimize use of one or more local-computer-device resources by multiple subject interfacing components 310, 312—e.g., projection/application systems.

The term subject, here, is used to indicate that the object is using or about to use the present technology. If a smartphone has 25 apps and 2 phone-vehicle projection systems, but only 3 of the apps and 1 of the phone-vehicle projection systems are using the present technology (intelligent, dynamic mapping to virtual versions of one or more base hardware resources, for instance), then those 4 can be referred to as subject interaction components at the time. If phone use changes, such that 4 apps and 2 phone projection systems were being used, then those 6 would be subject interaction components.

The optimization algorithm is in various embodiments configured to control mapping, switching and multiplexing by any of (i) maximizing functionalities among subject interfacing components 310, 312, or modules of the interfacing components 310, 312, (ii) minimizing cost of using resource among the interfacing components 310, 312, or modules of the interfacing components 310, 312, or (iii) both.

The optimization algorithm is in various embodiments configured to be subject to (e.g., configured to consider) an availability (or limitation to availability) of software and/or hardware resources at the local computing device 34 associated with the base data-processing component 340. The optimization algorithm is in various embodiments configured to be subject to (e.g., to consider) an availability or limited availability of software and/or hardware resources of the interface components 310, 312.

In various embodiments, the algorithm can be represented by one or more equations, functions, or relationships. Each can take any suitable form, such as optimization equation, a cost-function equation, a penalty-function equation, and/or a restraint-function equation. As mentioned, these optional equation types can be referred to generally as optimization equations.

While the algorithms are at times referred to simply as optimization equations herein, the disclosure can include other types of suitable equations.

The term optimization is in various embodiments used in connection with equations to refer to a nature of the equations, being configured to, as an example, optimize resource usage (use of a smartphone hardware codec, framebuffer, etc.) among various interface components 310, 312—e.g., phone projection systems and apps.

While the algorithm can include other variables for the equations, in various embodiments, variables include a total number N of interface components.

Equations are in various embodiments configured to be processed with respect to each particular, $j^{th}$, interface component of the total number of components N.

J refers to a number of jobs, or functions to be performed by virtual data-processing components for the interface components 310, 312.

Generally, the equations are configured based on a premise or realization that less conflict in virtual-resource sharing is likely when less jobs (J) are running. An example job is an interface component using a hardware data-processing component 340 via a virtual data-processing component 320. Benefits of having less conflict include more efficient and speedy operations at the local communication device 34 and between the LCD 34 and host system 10.

Other algorithmic relationships are:
- $r = \{r_0, r_1, \ldots, r_{N-1}\}$: the quantities of available resources on server;
- $p_j = \{p_0^j, p_1^j, \ldots, p_{N-1}^j\}$: required resources;
- $s_j = \{s_0^j, s_1^j, \ldots, s_{N-1}^j\}$: percentage usage of the shared resources;
- $c_j = \{c_0^j, c_1^j, \ldots, c_{N-1}^j\}$: performance penalty (cost) for resource sharing policy;
- $c_j = \{0, \ldots, 0\}$ when $s_j = \{1, \ldots, 1\}$
- $c_j = \{0, \ldots, 0\}$ when $s_j = \{1, \ldots, 1\}$; and
- $c_j = \{\infty, \ldots, \infty\}$ when $s_j = \{0, \ldots, 0\}$.

Two optimization relationships are as follows:

$$\text{Given J,} \quad \text{Minimize} \sum_{0 \leq i < N, 0 \leq j < J} (c_i^j) \quad \text{Subject to:} \sum_{0 \leq j < J} (p_j \cdot s_j) \leq r \quad \text{[Equation 1]}$$

-continued $$\text{Given maximal cost C, maximize J, subject to:} \quad \sum_{0 \leq j < J} (p_j \cdot s_j) \leq r \text{ and} \quad \sum_{0 \leq i < N, 0 \leq j < J} (c_i^j) < C \quad \text{[Equation 2]}$$

These optimization Equations 1, 2 can be viewed as alternative approaches to determine what virtual resources can or should be used by each ($j^{th}$) of multiple interface components 310, 312 at a time.

Equation 1 is configured to determine, already knowing a number (J) of subject interface components, a minimum cost, or resource usage or overhead, possible in the interface component using virtual representations of based resources—such as a hardware codec component, a framebuffer/drawing window component, a data piping component, and an encryption component. Knowing the minimum cost is useful in the mapping function because the system could determine whether the system still has sufficient resource available to accommodate a new request to further share functionality of a subject base data-processing unit(s) (e.g., hardware-based codec) with additional apps or projection systems, beyond the app(s) and/or projection system(s) already using the subject base data-processing unit(s) (e.g., hardware-based codec).

In the other approach, Equation 2 is configured to determine, given a maximum cost, a maximum number of jobs (J) that can be performed by interface components sharing a hardware data-processing resource 340, via virtual representations 320, within the known maximum cost. Determining the maximum number of jobs (J) is useful in the mapping function because the system can determine if the system should reject any new requests for sharing the subject base data-processing units regarding any new potential job.

In various embodiments, solutions to one or both Equations 1, 2 exist via exhaustive search if a total number of interface components N is relatively small. The computation requirement is not high to cover the entire solution space when N is not large. As an example, if there are two active projection systems, each with only one active application, N will be around 5 and considered a relatively small value. On the contrary, if there are three or more active projection systems, each with multiple active applications, N will be relatively larger, such as up to or greater than 15.

If a total number of interface components N is relatively large, a more generic function, using dynamic programming will efficiently provide a viable solution to Equations 1, 2, if such solutions indeed exist.

In various embodiments, the system is configured so that, if there is not a solution available by the applicable equation(s)—e.g., equation 1, 2, or both—then the system will reject a present request (from a particular application or projection system, for instance) and gradually, relax a constraint for the application equation(s) until a feasible solution can be found via an ongoing, possibly exhaustive, search, with N being relatively small, or via dynamic programming or a variant or similar programming action, with N being relatively large.

Figure 4:
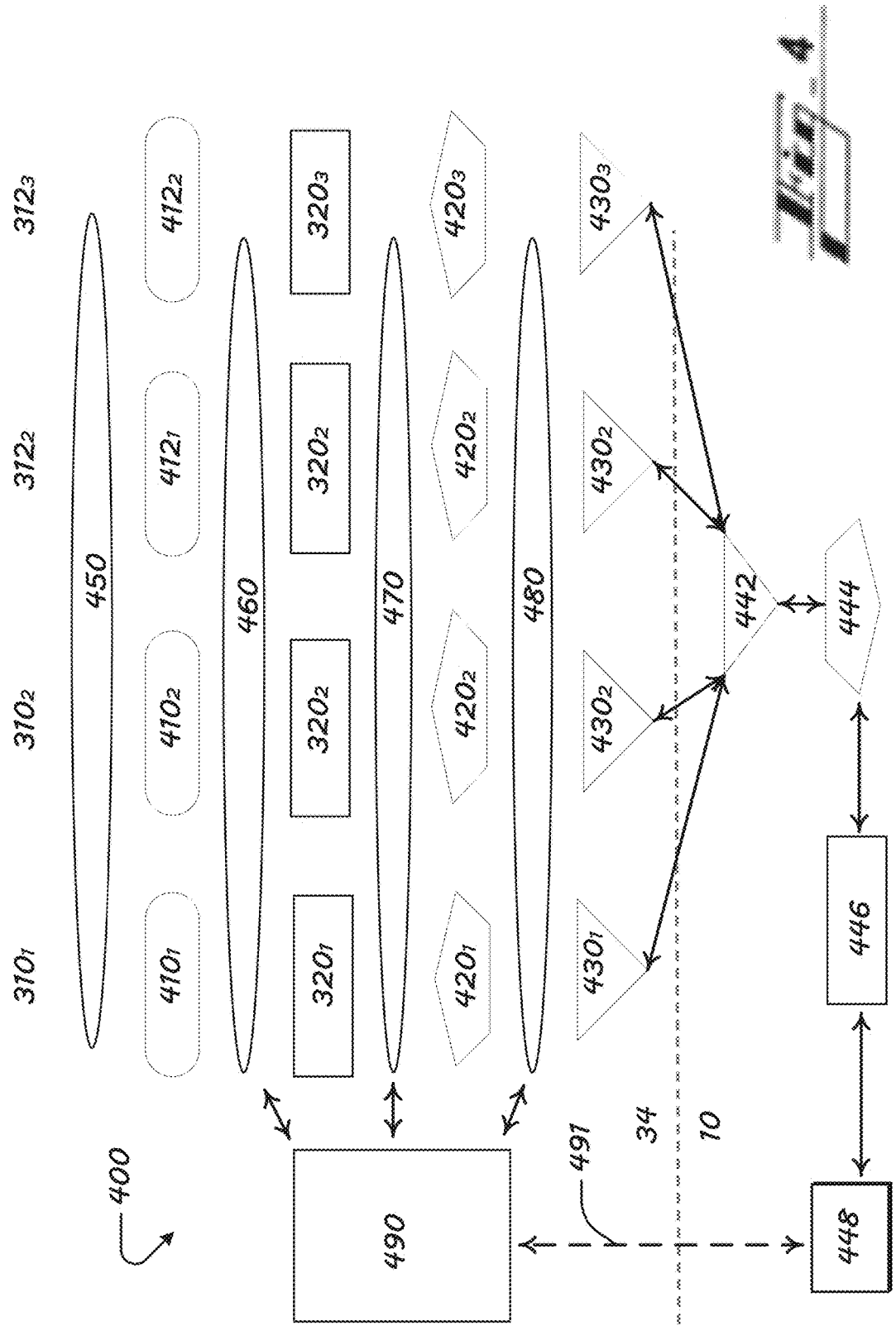
FIG. 4 shows data domain components of a local computing device and a host system and interactions between them.

V.C. FIG. 4—Second Example Components and Functions

FIG. 4 shows an arrangement 400 including data domain components of a local computing device 34 and a host apparatus 10. The arrangement can be referred to as a server-client arrangement, with the local-computing device playing more of or fully a server role and the host system playing more of or fully a client role.

While the local computing device 34 can at times perform client functions, and the host system 10 can perform server functions, the local computing device 34 can be referred to generally as the server side, providing data or other output to the host system being the client side, of the arrangement 400.

The local computing device 34 includes two example projection systems $310_1$, $310_2$, and two example applications $312_1$, $312_2$. Each of the applications $312_1$, $312_2$ can be operating by way of one or both of the projection systems $310_1$, $310_2$.

The local computing device 34 further includes first virtual data-processing components $410_{1-4}$. These components $410_{1-4}$ can be referred to, for instance, as a first virtual data-processing component #1 $410_1$, first virtual data-processing components #2 $410_2$, first virtual data-processing components #3 $410_3$, and first virtual data-processing components #4 $410_4$.

In one embodiment, the first virtual data-processing components $410_{1-4}$ are virtual framebuffer components, which can also be referred to as virtual drawing-window components.

The virtual nature of the virtual data-processing components is described above in connection with the arrangement 300 of FIG. 3.

Each of the first virtual data-processing components $410_{1-4}$ is generated based on a first primary or base data-processing component. While a base data-processing component 340 is shown in FIG. 3 with corresponding virtual components, one is not shown in FIG. 4 with the virtual components in order to simplify the view and because the format of the virtualization was described regarding FIG. 3.

The base data-processing component can be a partially, mostly, largely, or fully hardware components. The base data-processing component can be a hardware framebuffering memory component, for example.

Further in the example of FIG. 4, the local computing device 34 includes second virtual data-processing components $320_{1-4}$. In one embodiment, the second virtual data-processing components $320_{1-4}$ are virtual codec or encoder components. Each of the second virtual data-processing components $320_{1-4}$ is generated based on a second primary data-processing component—again, not show expressly in FIG. 4—which can be a base hardware component. The base data-processing component is in some implementations a hardware codec or encoder component, for instance. An example encoder or codec is an H.264 encoder or codec. In this case, the base data-processing component can be H.264-encoder hardware, and the second virtual data-processing components $320_{1-4}$, virtual representations of the hardware encoder.

Further in the example of FIG. 4, the local computing device 34 also includes third virtual data-processing components $420_{1-4}$. In one embodiment, the third virtual data-processing components $420_{1-4}$ are virtual encryption components. Each of the third virtual data-processing components $420_{1-4}$ is generated based on a third primary data-processing component—not show expressly in FIG. 4 to simplify the illustration—which can be a base hardware component. The base data-processing component thus in some implementations encryption hardware, for instance.

In the example of FIG. 4, the local computing device 34 further includes fourth virtual data-processing components $430_{1-4}$. In one embodiment, the fourth virtual data-processing components $430_{1-4}$ are virtual data-piping components. Each of the fourth virtual data-processing components $350_{1-4}$ is generated based on a fourth primary data-processing component—again not show expressly in FIG. 4 for simplicity—which can be a base hardware component. The base data-processing component thus in some implementations includes data-piping hardware (wired and/or wireless), for instance.

Example data-piping components include USB, BT, and/or Wi-Fi connecting components.

While various types of server-side virtual components are shown in FIG. 4, it should be appreciated that any phone projection system may include its own data-processing component of any type. For instance, while four (4) virtual framebuffers, or drawing windows, 410 are shown, each projection system may include its own framebuffer, which can be a hardware buffer. One, more, or each of such various framebuffers can be a base or primary framebuffer for two or more virtual framebuffers.

As another example, while four (4) virtual encryption components 420 are shown, each projection system may include its own encryption component, which can be a hardware encryption component. One, more or each of such various encryption components can be a base or primary encryption component for two or more virtual encryption components.

The server-side (local-device 34 side) data-piping virtual components 430 connect, via the corresponding based data-piping component (not shown) to a first client-side data-processing component 442 of the host apparatus 10. The first data-processing component 442 is in one embodiment a data-piping processing component.

The client-side data-piping component 442 includes hardware. On the client side, as well, example data-piping components include USB, BT, and/or Wi-Fi connecting components corresponding to the server-side options.

The host-system 10 of the arrangement 400 still further includes a decryption component 444, corresponding to the base encryption component on the server side, and a decoder or coded component 446 corresponding to the base encoder or codec of the local computing device 34.

The client side (side of the host system 10) further includes an output component 448 for receiving data received from the local computing device and/or a user of the host device 10. Output can be received, more specifically, from the application(s) running on the local computing device 34, via the virtual and/or hardware data-processing components of the local computing device 34. Output is also received via the client-side data-processing components 442, 444, 446, 448.

An example output component 448 is a human-machine interface (HMI), such as a vehicle touch-sensitive display screen and/or audio system (speaker/microphone).

With continued reference to the server side (side of the local device 34), the example arrangement 400 includes four (4) intelligent, dynamic mapping modules, or four (4) mapping sub-modules 450, 460, 470, 480 of a single mapping module. That is, a single module, or multiple modules or sub-modules, can performed the functions described herein with respect to the mapping components 450, 460, 470, 480 shown. In the case of sub-modules 450, 460, 470, 480, the single mapping module is considered shown in FIG. 4 schematically by the constituent sub-modules 450, 460, 470, 480. While, for simplicity, the arrangement is described primarily from the perspective of including multiple modules 450, 460, 470, 480, the same descriptions are meant to include embodiments in which a single module performs the tasks, whether that single module includes sub-modules. Reference in the claims too, then, to a single mapping module can include more than one module, or sub-modules of a single module, having the recited structure and/or for performing the recited functions.

In various embodiments, the first module (or sub-module) 450, shown, is not present.

In various embodiments, the dynamic mapping modules (or sub-modules) 450, 460, 470, 480 correspond respectively to the virtual framebuffer, codec, encryption, and data-piping components 410, 320, 420, 430. Namely, the first dynamic mapping module 450 controls use, such as timing of use, by the interface components 310, 312 of the virtual framebuffers $410_{1-4}$; the second dynamic mapping module 460 controls use, by the interface components 310, 312, of the virtual codecs $320_{1-4}$; the third dynamic mapping module 470 controls use by the interface components 310, 312, of the virtual encryption components $420_{1-4}$; and the fourth dynamic mapping module 480 controls use by the interface components 310, 312, of the virtual data-piping components $430_{1-4}$.

Mapping functions performed by the mapping modules (or sub-modules) 450, 460, 470, 480, when executed by the subject processor (e.g., processor 204), in various embodiments include multiplexing or switching amongst the various virtual data-processing virtual components $410_{1-4}$, $320_{1-4}$, $420_{1-4}$, $430_{1-4}$, or functions of the various virtual data-processing virtual components $410_{1-4}$, $320_{1-4}$, $420_{1-4}$, $430_{1-4}$.

The mapping, multiplexing, and/or switching is performed in accord with one or more algorithms or equations of an algorithm module. The algorithm module is indicated by reference numeral 490 in FIG. 4.

The algorithm module 490 in various embodiments includes any one or more of the equations described herein, including and not limited to Equation 1 and Equation 2, above.

In various embodiments, the mapping, multiplexing, and/or switching control various resource usage. In one embodiment, the mapping, multiplexing, and/or switching controls which virtual resource of a particular type (e.g., virtual codecs) is allowed to access the underlying base component (e.g., H.264 hardware encoder) at a given time.

In contemplated embodiments, the mapping, multiplexing, and/or switching controls interactions between levels of the server-side data-processing components. For instance, the first mapping module 450 could control when, and/or to which virtual framebuffer 410, data is passed from one or more of the interface components $310_{1-4}$ at a first time, the second mapping module 460 controls when and/or to which virtual codec 320 data is passed from one or more of the virtual framebuffers $410_{1-4}$ at a second time, and so on.

With further reference to the arrangement 400 of FIG. 4, link 491 can be considered to indicate schematically that in some embodiments a user can change or program the algorithm(s) 490, via a vehicle interface, tablet computer in communication with the vehicle, the like or other.

Figure 5:
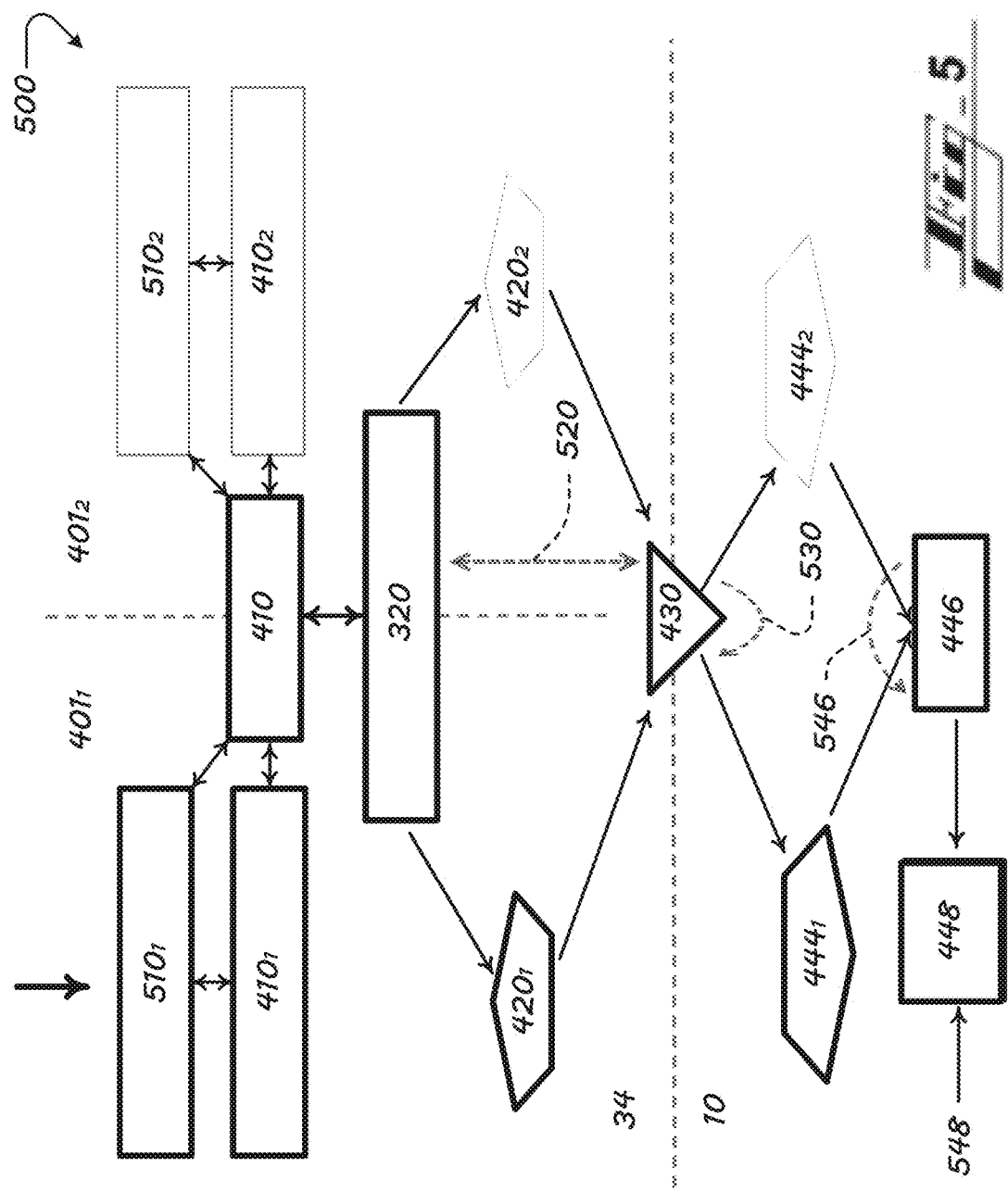
FIG. 5 shows components of another example local computing device and host system arrangement, with operations of a first projection system of the local computing device being highlighted.

V.D. FIG. 5—Third Example Components and Functions

FIG. 5 shows components of another view of an example server-client arrangement 500, according to the present technology, with operations of a first projection system $401_1$ of the local computing device 34 being highlighted.

The arrangement 500 includes a first projection system $401_1$ and a second projection system $401_2$.

The local computing device 34 includes multiple data-processing components 410, 320, 420, 430. Any of the data-processing components can be virtualized, such as to create two (or more) virtual versions of itself for at least each of the first and second projection systems $401_1$, $401_2$.

The virtualizations can be generated and operated as described above in the examples of FIGS. 3 and 4.

In various embodiments, a distinct data-processing component can be present at the local computing device 34 for each of multiple interface components 310, 312. For instance, the device 34 may include two distinct hardware framebuffers, corresponding to the multiple interface components $401_1$, $401_2$.

The arrangement 500 shows an embodiment in which a single framebuffer 410 is virtualized into two $410_1$, $410_2$. The arrangement 500 includes, by way of example, two distinct encryption components $420_1$, $420_2$. Each of the encryption components $420_1$, $420_2$ is in various embodiments dedicated respectively to the first and second interface component $401_1$, $401_2$.

A single encoder 320 and a single data-piping component 430 are shown in FIG. 5. The arrangement 500 can include for each data-processing components, though, as with any data-processing component, any of (A) a single data-processing component to be shared by the various interface components $401_1$, $401_2$ without virtualization, (B) a single data-processing component virtualized to facilitate resource sharing by the various interface components $401_1$, $401_2$, or (C) various data-processing components used by respective interface components $401_1$, $401_2$. Any of the non-virtual data-processing components can, as mentioned, be fully, largely, or partially hardware.

Data can be passed in both directions between the local computing device 34 and host apparatus 10, as indicated by reference line 520.

With further reference to the arrangement 500 of FIG. 5, the links 530 and 546 indicate that the corresponding modules 430 and 446 can be configured and arranged in the system 500 to accommodate any of the applications or projection systems that may need the modules' (430, 446) resources.

The data-piping component 430 shown can be one, multiple, or virtualized data-piping components 430. The component 430 shown can also be considered to show schematically both, interfacing, server-side (with local device 34) and client-side (with host system 10) data-piping components.

The view 500 also shows distinct decryption components $444_1$, $444_2$, which can be distinct hardware components or, in a contemplated embodiment, virtual components. That is, in contemplated embodiments, the host apparatus 10 is configured with a base data processing component (e.g., a base decryption component 444, not shown) that is virtualized to the two virtual data-processing components (e.g., $444_1$, $444_2$, for sharing the base data-processing resource, in the same or similar manner to that described with respect to virtualizations on the server side, at the local computing device 10.

The output component 448 can in any embodiment be an input/output component, such as a touch-sensitive display screen and/or audio components, capable of receiving user input 548, processing the same, and (1) delivering output for human user consumption, and (2) passing along corresponding data or signals to other users such as components of the local computing device 10 and, in some cases, to components of the local computing device 34.

V.E. FIG. 6—Fourth Example Components and Functions

FIG. 6 shows the arrangement 500, with operations of the second projection system $401_2$ of the local computing device 34 highlighted.

Features of the arrangement 500 shown in FIG. 6 can otherwise be like those described above for FIG. 5 and are not described further here.

V.F. FIG. 7—Fifth Example Components and Functions

FIG. 7 shows an arrangement 700 like the arrangement 500 of FIGS. 5 and 6, and also including an additional apparatus 702, such as a Wi-Fi or BT enabled camera.

While one additional apparatus 702 is shown, the arrangement 700 includes two or more additional apparatus in various embodiments.

The additional apparatus 702 can be a peripheral and/or connected to the local computing device 34 or to the host apparatus 10. In various embodiments, the additional apparatus 702 is/are a part of the local computing device 34 or the host apparatus 10.

Input from the other apparatus 702 is provided to one or more of the interface components $401_1$, $401_2$ and can be processed via hardware and/or virtual data-processing components of the local communication device 34 and/or of the host system 10, according to the resource-using and resource-sharing principles described herein.

Interface components, such as an application 312, may use apparatus output. An example application using the output component 702, being a camera, is a virtual-reality application using camera data to formulate images to be provided to a human user by way at least one projection system $401_1$, $401_2$ and of a host device 10 screen.

V.G. FIG. 8—Sixth Example Components and Functions

FIG. 8 shows the arrangement 500 of FIG. 5 highlighting user input 548 provided via a host-vehicle interface 448. The feedback can as shown be sent to the first projection system $401_1$.

The output component 448 can be an input/output component, such as a touch-sensitive display screen, capable of receiving the user input 548, processing the same, and passing along corresponding data or signals to components of the local computing device 10 and in some cases to components of the local computing device 34 and/or remote networks and apparatus 40, 50 (FIGS. 1 and 2).

User-input data being is indicated in FIG. 8 by broken line and reference numeral 801, as being transferred to one or more of the components of the local computing device 34 from user input 548 received at the i/o component 448. The transfer 801 can be provided via any host-system and local-device data-processing components—446, 444, 430, 420, etc.

VI. Additional Structure, Algorithmic Features, and Operations

In combination with any of the other embodiments described herein, or instead of any embodiments, the present technology can include any structure or perform any functions as follows:

a. The technology in various embodiments includes multiple interface components (e.g., references 310, 312, 401)—such as phone projection components and apps, running on a single embedded device, such as a smartphone or USB mass-storage device, or a generic USB class device.

b. In various embodiments, two or more of the servers, or interface components, operate simultaneously.

c. The referenced HW/SW Device Function Virtualization (DFV) allows multiple interface components (e.g., references 310, 312, 401) to share critical system resources interchangeably.

d. The technology can in various embodiments be implemented via a smartphone projection, system (or, smartphone screen replication system);

e. The technology can in various embodiments be implemented via a replication or projection system embodied in a mass-storage-device-class devices or plug-in, such as a USB MSC, also known as a UMS, in the form of a dongle or otherwise.

f. The host system 10 in various embodiments includes a vehicle head unit. The head unit coordinates with the local communication device 34, such as a user mobile device—e.g., smartphone. The arrangement in various embodiments connects the local communication device 34 to the host apparatus 10, which includes at least one local-communication-device projection system and/or connected application.

g. The algorithm in various embodiments operates to exchange application contents between various local-communication-device projection systems, and share local-communication-device resources efficiently amongst the interface components of the local communication device.

h. The technology in various embodiments includes a mechanism to isolate the control plan actions and the data plane operations between different phone projection systems and apps. In embodiments, the control-plain operation determines the structure, parameters, and types, or fashions, of multiplexing a shared resource among multiple tasks. Data-plan operations execute detailed operations to accomplish these tasks requested by the phone projection systems or applications. An example shared resource is a hardware-based data-processing device, such as a base H.264 codec 340. Example tasks to which the resource is shared include phone projection system/s task(s) and/or phone application task/s).

i. In various embodiments, projection servers are triggered upon device discovery, such as via a USB, Wi-Fi, or BT port.

VII. Select Advantages

Many of the benefits and advantages of the present technology are described above. The present section restates some of those and references some others. The benefits described are not exhaustive of the benefits of the present technology.

In various embodiments, the present technology can be implemented without need to adjust select or all hardware of the host apparatus 10, such as hardware of a vehicle, such as that of a host or client HMI.

Apparatus, algorithms, and processes are provided that allow more than one user-device (e.g., smartphone) projection system and/or more than one user-device application to operate and interface simultaneously with a host system, such as a vehicle of transportation.

Benefits of the present technology also include allowing sharing of resources of at least open or partially-open projection systems.

Apparatus, algorithms, and processes of the present technology provide user-device hardware-software (HW/SW) device function virtualization (DFV), which can isolate select control plane and data plane operations of the user device, promoting system flexibility.

HW/SW DFV allows the interface components (e.g., 310, 312, 401) to share critical system resources interchangeably, under authorized operation domain.

By HW/SW DFV, the local computing device 34 can enjoy various operational benefits, including any of: (a) faster processing associated with functions of one or more interface components, such as apps or projection systems, (b) using less resources than would be used without DFV, (c)

using less processing-power than would be used without DFV, and (d) providing to the user—via the local computing device 32 and host apparatus 10—more-enriched app content and functionality, or more-enriched content and functionality distinct from apps. By such advantages, related benefits include and are not limited to (e) user satisfaction and/or (f) improved provisions of data or content to or from the local communication device 34 and users thereof, whether local, remote, human, or electronic.

Implementation in some embodiments advantageously does not require adding, removing, or otherwise changing of hardware of the local communication device 34 or of the host apparatus 10. There is, in various embodiments, for instance, no need to change a system resource, such as a hardware data-processing component, a CPU, a memory footprint, a sensors, etc. These benefits including cost and material savings in manufacturing, maintenance, or service.

Implementation in some embodiments beneficially does not require modification to any input/output, or HMI, software of the host apparatus 10. Benefits including cost and material savings in manufacturing, maintenance, or service.

VIII. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A multi-modal projection system, for use at a mobile device in projecting device output via a host apparatus, comprising:
   a hardware-based processing unit;
   a base data-processing resource needed by each of a plurality of interface components to generate the device output to be projected via the host apparatus; and
   a non-transitory computer-readable storage component comprising:
   the plurality of interface components that, when executed by the processing unit, generate the device output to be projected via the host apparatus;
   a plurality of virtual data-processing components being virtual representations of the base data-processing resource, wherein each of the plurality of interface components is connected to the base data-processing resource by one of the plurality of virtual data-processing components and each of the plurality of interface components uses a respective one of the plurality of virtual data-processing components to access the base data-processing resource; and
   a mapping module that, when executed by the processing unit, controls access for the interface components to the base data-processing component by way of the virtual data-processing components, wherein the mapping module controls access to the data processing resources of the base data-processing resource to share the data processing resources among the plurality of interface components.

2. The multi-modal projection system of claim 1 wherein the interface components include:
   two or more mobile-device projection sub-systems; or
   at least one mobile-device projection sub-system and at least one mobile-device application.

3. The multi-modal projection system of claim 1 wherein the mapping module, in controlling access to the base data-processing component by way of the virtual data-processing components, performs switching or multiplexing functions.

4. The multi-modal projection system of claim 1 wherein the mapping module, in controlling access to the base data-processing component by way of the virtual data-processing components, controls the access based on at least one algorithm comprising an optimization equation.

5. The multi-modal projection system of claim 1 wherein:
   the base data-processing component includes a hardware-based component selected from a group consisting of:
   a framebuffer component;
   a codec component;
   an encryption component; and
   a data-piping component; and
      the virtual data-processing component are virtual representations of the selected hardware data-processing component.

6. The multi-modal projection system of claim 1 wherein:
   the base data-processing resource is a first base data-processing resource;
   the plurality of virtual data-processing components are a first plurality of virtual data-processing components being virtual representations of the first base data-processing resource;
   the multi-modal projection system further comprises a second base data-processing resource needed by each of the interface components to generate the device output to be projected via the host apparatus;
   the non-transitory computer-readable storage component comprises a plurality of virtual data-processing components being virtual representations of the second base data-processing resource; and the mapping module, when executed by the processing unit, controls access for the interface components to the second base data-processing resource by way of the second virtual data-processing components.

7. The multi-modal projection system of claim 1 wherein the multi-modal projection system is part of a smartphone, a user-wearable electronic, or a generic universal-serial-bus-class (generic USB-class) system.

8. The multi-modal projection system of claim 1 further comprising a mobile-device data-piping hardware component that receives device output from upstream data-processing components of the multi-modal projection system and delivers the device output to a corresponding host-apparatus data-piping hardware component for delivery via the host apparatus for consumption by a user of the multi-modal projection system and the host apparatus.

9. The multi-modal projection system of claim 1 wherein the host apparatus is part of a vehicle of transportation.

10. The multi-modal projection system of claim 9 wherein the host apparatus includes a human-machine interface for delivering the device output for consumption by a human user of the multi-modal projection system and the host apparatus.

11. The multi-modal projection system of claim 1 wherein the non-transitory computer-readable storage component comprises an interface-component generation module that, when executed by the hardware-based processing unit, generates the plurality of interface components.

12. A non-transitory computer readable storage device, for use at a multi-modal projection system of a mobile device to project device output via a host apparatus, comprising:
   a plurality of interface components that, when executed by a processing unit, generate the device output to be projected via the host apparatus;
   a plurality of virtual data-processing components being virtual representations of a base data-processing resource needed by each of the plurality of interface components to generate the device output to be projected via the host apparatus, wherein each of the plurality of interface components is connected to the base data-processing resource by one of the plurality of virtual data-processing components and each of the plurality of interface components uses a respective one of the plurality of virtual data-processing components to access the base data-processing resource; and
   a mapping module that, when executed by the processing unit, controls access for the interface components to the base data-processing component by way of the virtual data-processing components, wherein the mapping module controls access to the data processing resources of the base data-processing resource to share the data processing resources among the plurality of interface components.

13. The non-transitory computer readable storage device of claim 12 wherein the interface components include:
   two or more mobile-device projection sub-systems; or
   a mobile-device projection sub-system and a mobile-device application.

14. The non-transitory computer readable storage device of claim 12 wherein the mapping module, in controlling access to the base data-processing component by way of the virtual data-processing components, performs switching or multiplexing functions.

15. The non-transitory computer readable storage device of claim 12 wherein the mapping module, in controlling access to the base data-processing component by way of the virtual data-processing components, controls the access based on at least one algorithm comprising an optimization equation.

16. The non-transitory computer readable storage device of claim 12 wherein:
   the base data-processing component includes a hardware-based component selected from a group consisting of:
   a framebuffer component;
   a codec component;
   an encryption component; and
   a data-piping component; and
      the virtual data-processing component are virtual representations of the selected base data-processing resource.

17. The non-transitory computer readable storage device of claim 12 wherein:
   the base data-processing resource is a first base data-processing resource;
   the plurality of virtual data-processing components are a first plurality of virtual data-processing components being virtual representations of the first base data-processing resource;
   the multi-modal projection system further comprises a second base data-processing resource needed by each of the interface components to generate the device output to be projected via the host apparatus; and
   the non-transitory computer-readable storage device comprises a second plurality of virtual data-processing components being virtual representations of the second base data-processing resource; and
   the mapping module, when executed by the processing unit, controls access for the interface components to the second base data-processing resource by way of the second virtual data-processing components.

18. The non-transitory computer readable storage device of claim 12 wherein:
   the multi-modal projection system is part of a smartphone, user-wearable electronic, or a generic universal-serial-bus-class (generic USB-class) system; and
   the host apparatus is part of a vehicle of human transportation.

19. The non-transitory computer readable storage device of claim 12 wherein the non-transitory computer-readable storage device comprises an interface-component generation module that, when executed by the hardware-based processing unit, generates the plurality of interface components.

20. A method, for use at a multi-modal projection system of a mobile device in projecting device output via a host apparatus, comprising:
   generating, by a hardware-based processing unit executing a plurality of interface components of a non-transitory computer readable storage device, the device output to be projected via the host apparatus;
   generating, by the hardware-based processing unit executing code of the non-transitory computer readable storage device, a plurality of virtual data-processing components to be virtual representations of a base data-processing resource needed by each of the plurality of interface components to generate the device output to be projected via the host apparatus, wherein each of the plurality of interface components is connected to the base data-processing resource by one of the plurality of virtual data-processing components and each of the plurality of interface components uses a respective one of the plurality of virtual data-processing components to access the base data-processing resource; and controlling, by the hardware-based processing unit executing a mapping module, access to the base data-processing component by way of the virtual data-processing components, wherein the mapping module controls access to the data processing resources of the base data-processing resource to share the data processing resources among the plurality of interface components.

\* \* \* \* \*